United States Patent [19]
Vroemen et al.

[11] Patent Number: 5,841,251
[45] Date of Patent: Nov. 24, 1998

[54] TEST SIGNALS AND TEST SIGNAL GENERATORS FOR USE WITH PAL PLUS TELEVISIONS

[75] Inventors: Rene Vroemen, Vriezenveen, Netherlands; Rolf Putzhofen, Struenhuetten, Germany

[73] Assignee: Fluke Corporation, Everett, Wash.

[21] Appl. No.: 655,996

[22] Filed: May 31, 1996

[30] Foreign Application Priority Data

Jun. 2, 1995 [EP] European Pat. Off. .............. 95303833

[51] Int. Cl.$^6$ ...................................................... H04N 17/00

[52] U.S. Cl. ........................................... 348/181; 348/189

[58] Field of Search ..................................... 348/180, 181, 348/182, 183, 184, 185, 189, 191; 345/904; 324/770; H04N 17/00, 17/02, 17/04, 17/06

[56] References Cited

U.S. PATENT DOCUMENTS

| | | | |
|---|---|---|---|
| 4,625,096 | 11/1986 | Morgan | 348/181 |
| 5,117,483 | 5/1992 | Latshaw | 348/181 |
| 5,526,057 | 6/1996 | Flannaghan | 348/557 |

*Primary Examiner*—Nathan J. Flynn
*Attorney, Agent, or Firm*—George T. Noe

[57] ABSTRACT

A test pattern is suitable for a television signal decoder which detects changes in the color content of a signal from frame to frame, and on the basis of these changes attenuates high frequency luminance components, and possibly switches its output between intra-frame averaged chrominance and high-frequency luminance signals and directly-derived signals. The test pattern has discrete areas within which a motion value representing the change in chrominance from frame to frame is constant, but different from the value in other areas. The areas also contain a high-frequency luminance component. Other areas have a hue which varies from field to field.

16 Claims, 7 Drawing Sheets

TEST SIGNALS AND TEST SIGNAL GENERATORS FOR USE WITH PAL PLUS TELEVISIONS

This invention relates to test signals for testing television signal decoders, generators for generating such signals, and methods of testing using such signals. The invention is particularly concerned with the testing of television signal decoders which attenuate high frequency luminance components in response to detecting movement in the picture content of the signal, as represented by the chrominance part of the signal.

In conventional television systems, such as the PAL system, colour signals are modulated on a colour subcarrier, and transmitted along with the luminance signal. One known problem is cross-colour interference, in which luminance signals at frequencies near the subcarrier are accepted by the decoder and interpreted as chrominance signals. This results in random colour patterns superimposed on fine-detail areas of the picture, and is particularly apparent in picture areas containing black and white vertical or diagonal stripes.

One proposal for reducing or eliminating this effect is known as "fixed colour plus". In the PAL system, adjacent lines on a television screen are derived from successive fields, and use subcarriers of opposite phase. There is almost no difference between the colour information in the two adjacent lines. Accordingly, by adding the line signals together, it is possible to obtain a signal which represents luminance, and from which the chrominance has been cancelled, and by subtracting the line signals it is possible to derive the chrominance information and cancel the luminance information. (Alternatively, the colour signals could be demodulated, and then separated by averaging the contents of the successive fields. Both the luminance and chrominance information could be extracted by combining the digital data representing the line information, rather than using the analog signals.) This procedure, known as intra-frame averaging, is preferably used only for deriving the chrominance and high frequency luminance signals; the low frequency luminance signals are preferably derived directly from the respective fields, as in conventional systems. (Indeed the technique could in principle be used only for the chrominance signals.)

This technique provides an effective solution to cross-colour interference, particularly for television signals derived from film sources, in which the frame rate is 25 Hz, and therefore successive fields of the television signal (which have a 50 Hz rate) have stable picture content. However, if the picture content can represent movement from field to field, the fixed colour plus technique can produce motion artefacts in the form of colour judder, as a result of averaging the contents of the two fields.

This problem is mitigated by using a procedure known as "motion adaptive colour plus" (MACP). This involves detecting whether or not movement is occurring, and selecting to use an intra-frame averaged signal for relatively low levels of movement, and a non-intra-frame averaged (direct) signal if there is significant movement. Detection of movement is achieved by comparing the (averaged) colour components of one frame with the (averaged) colour components of the next frame, and processing the first frame in accordance with the results of the comparison. Processing of the second frame is controlled according to the difference between the averaged colour components of the second and third frames, etc. These operations are carried out on a pixel-by-pixel basis, whereby the difference between the (intra-frame averaged) colour contents of a particular pixel in successive frames determines whether the colour composition of that pixel is derived separately from each field, or by averaging the fields.

An MACP decoder preferably also attenuates the high frequency luminance signals in dependence upon the detected motion. This further improves performance by ensuring that there is no high frequency luminance signal to interfere with the colour signal when non-intra-frame averaging is used, and does not noticeably reduce the quality of the image because the fine detail in a moving image is virtually imperceptible to the human eye.

The present invention is concerned with test signals which allow the testing of television signal decoders which operate using the MACP procedure. Decoders conforming to the known PALplus system specification, which is primarily intended for wide screen television transmissions, use the MACP principles, and the present invention will primarily be described in the context of a test signal generator for testing a PALplus decoder. However, MACP can be used in other types of decoders, and the invention also extends to signal generators suitable for such other decoders.

According to one aspect of the present invention, there is provided a test pattern which includes a plurality of areas in which different rates of motion are simulated, and which contain a high frequency luminance component, so that anyone viewing the test signal on a television receiver can determine whether the decoder is attenuating the high frequency component differently in the different areas, in accordance with the MACP procedure.

Further aspects of the present invention are set out in the accompanying claims.

Preferably the test pattern carries legends indicating the degree of motion within each area. Preferably, there are different sets of such areas, the areas in each set having the same hue, but a different hue from that of the other sets. Preferably, the hue within each set is derived from one colour-difference signal which is caused to vary in order to simulate movement, the other colour-difference signal being constant and preferably zero, so that the behaviour of the decoder in response to movement as indicated by different colour-difference signals can be ascertained.

The techniques of the present invention can be used for testing decoders in any television equipment, such as television receivers, video recorders, etc.

An arrangement embodying the present invention will now be described by way of example with reference to the accompanying drawings, in which.

Figure 1A:
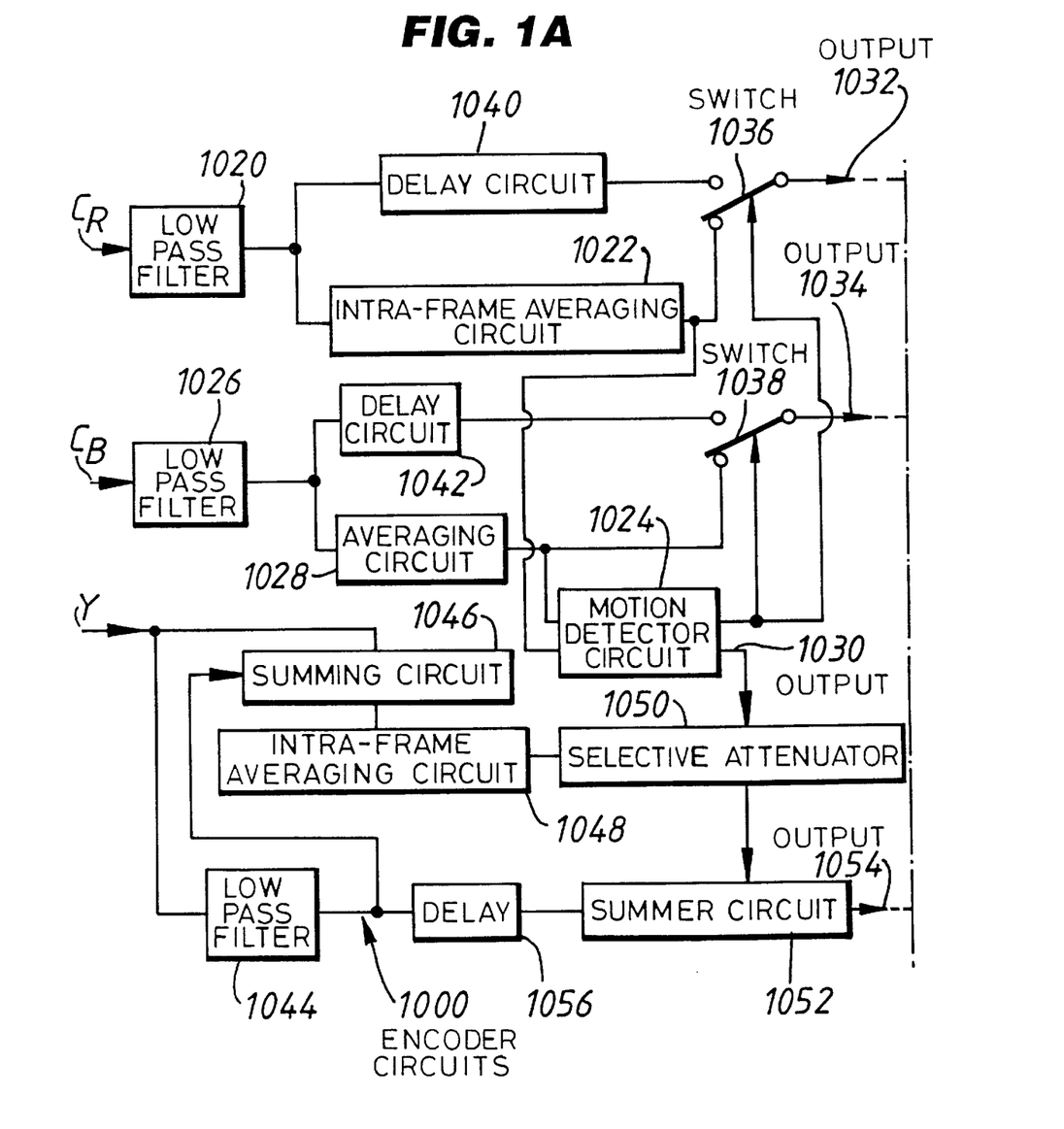
FIGS. 1A and 1B, when placed side by side, diagrammatically illustrate encoding and decoding operations using the MACP principles.
Figure 1B:
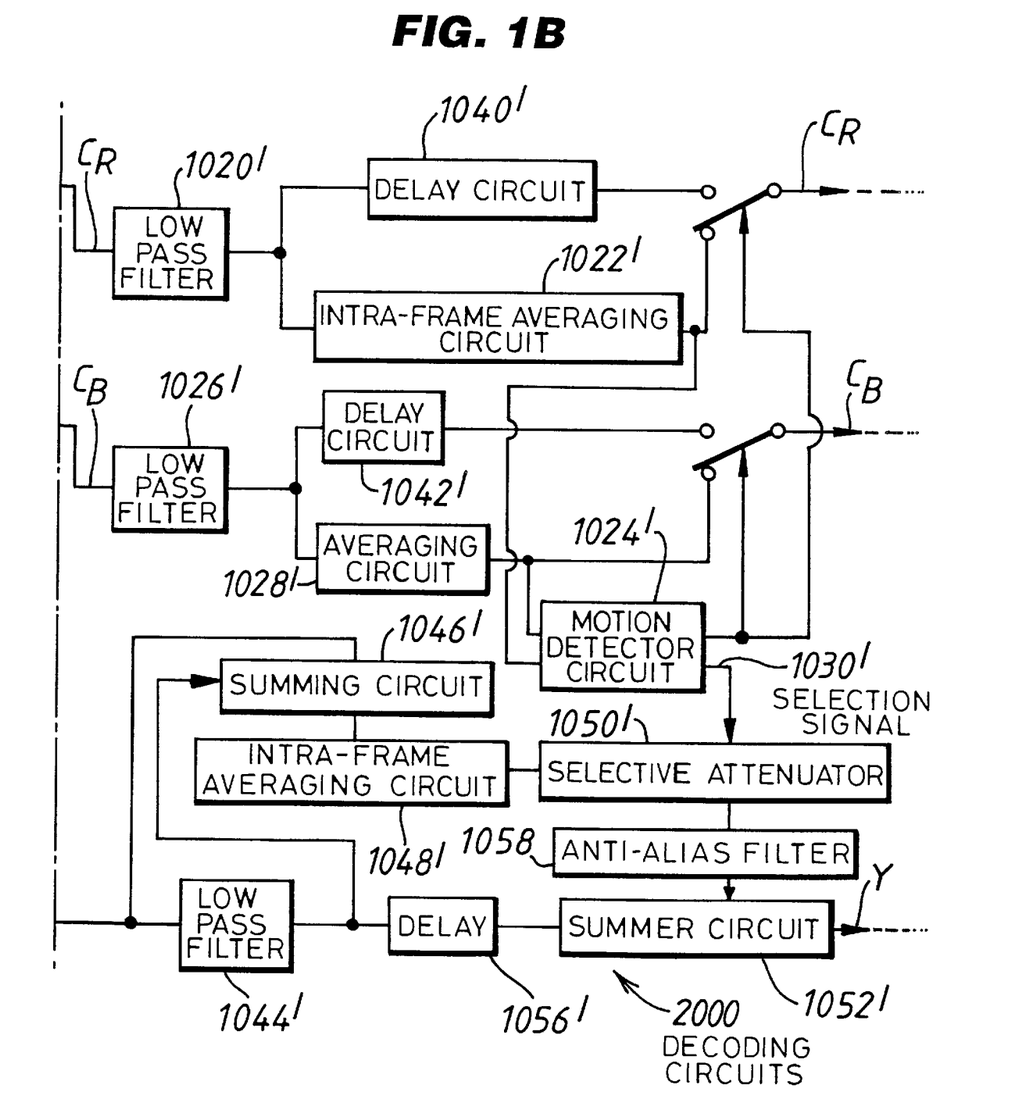

Referring to FIGS. 1A and 1B, this illustrates the encoding and decoding parts of the MACP process. The luminance signal Y, and the two chrominance signals $C_B$ and $C_R$, are delivered to the encoder circuits illustrated generally at 1000. The colour signal $C_R$ is low-pass filtered at 1020 and then delivered to an intra-frame averaging circuit 1022, which combines the $C_R$ signal for each pixel in the first field of a frame with the $C_R$ signal for the corresponding pixel in the second field (these two pixels representing vertically adjacent pixels in successive lines on a television screen). Thus, each pixel for line n in a PAL signal will be combined with the corresponding pixel in line n+312. The intra-frame average signal is then delivered to a motion detector circuit 1024.

The colour signal $C_B$ is similarly processed by low pass filter 1026 and averaging circuit 1028, the output of the latter also being delivered to the motion detector circuit 1024.

The motion detector circuit 1024, which includes storage circuitry, derives a value M representative of motion from the two intra-frame averaged signals. If the motion value M exceeds a predetermined level, a switching signal is provided at an output 1030. The encoder has $C_R$ and $C_R$ outputs at 1032 and 1034, which receive the intra-frame averaged signals from circuits 1022 and 1028, via switches 1036 and 1038, unless the motion value M exceeds a predetermined value, in which case the switching signal 1030 operates the switches 1036 and 1038 so that the outputs instead receive delayed versions of the input signals $C_R$ and $C_B$ (these are known as "direct chrominance" signals). Delay circuits 1040 and 1042 are used to compensate for the delays inherent in the intra-frame averaging circuits 1022 and 1028.

The luminance signal Y is delivered to a low pass filter 1044. Low frequency signals (below around 3 MHz) are delivered from the output of filter 1044 to a summing circuit 1046 which subtracts them from the input Y signal, so as to provide an output carrying only high frequency components of the luminance signal.

The high frequency luminance components are delivered to a circuit 1048 for performing intra-frame averaging, and then are delivered to a selective attentuator 1050. They are then attenuated by an amount which depends upon the motion value M evaluated by the motion detector 1024. They are then delivered to a summer circuit 1052 which adds them to a delayed version of the low-frequency components to derive the final output signal 1054 of the encoder. The delay, which is effected by circuit 1056, is to compensate for the inherent delay in the averaging circuit 1048.

The decoding processes performed by the decoding circuits shown generally at 2000 are very similar to the encoding processes. Thus, the colour signal $C_R$ is low pass filtered at 1020' and delivered to delay circuit 1040' and an averaging circuit 1022'. The output signal is derived from one or other of these two circuits depending upon a selection signal 1030' from a motion detector 1024'. The chrominance signal $C_B$ is processed similarly. The luminance signal is split into high and low-frequency components by low pass filter 1024' and summer 1046'. The high frequency components are averaged by averaging circuit 1048', selectively attenuated in circuit 1050' and then (preferably after being processed by an anti-alias filter 1058) added to the low frequency components in summer 1052' after the latter has been delayed by delay circuit 1056'.

Figure 2A:
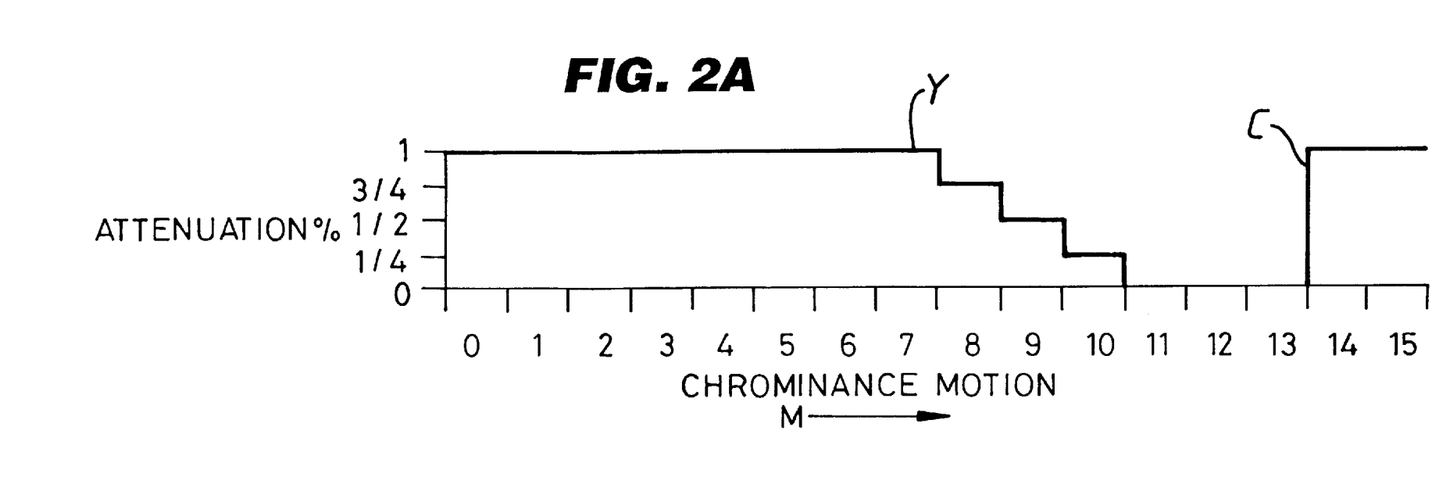
FIGS. 2A and 2B illustrate the effects of motion on high frequency luminance components, and the selection of direct or intra-frame averaged signals, in the encoder and the decoder.

FIG. 2A illustrates the operation of the motion detector 1024 in the encoder circuits 1000. As indicated above, each of the signals $C_B$ and $C_R$ is intra-frame averaged, that is, the component for each picture element in one field of the frame is added to the corresponding component for the second field. The resulting average is then compared with the corresponding value for the next frame. This gives two colour-change values, the first representing the change in $C_B$ between frames, and the second representing the change in $C_R$ between frames.

These two colour-change values are used to address a look-up table to generate a single value M representing chrominance motion. The arrangement is such that if any one of the two colour-change values is zero, the motion value M will increase as the other value increases. M increases faster if both values increase.

As indicated at Y in FIG. 2A, as the motion signal M reaches a value (in arbitrary units) of 8, the averaged high-frequency luminance components begin to be attenuated. They are attenuated to 75%, 50%, 25% and 0% of the original value for values of M equal to 8, 9, 10 and 11 (or higher), respectively. The switching signal 1030 (for disabling intra-frame averaging) is generated as the motion value M increases from 13 to 14, as indicated at C.

Figure 2B:
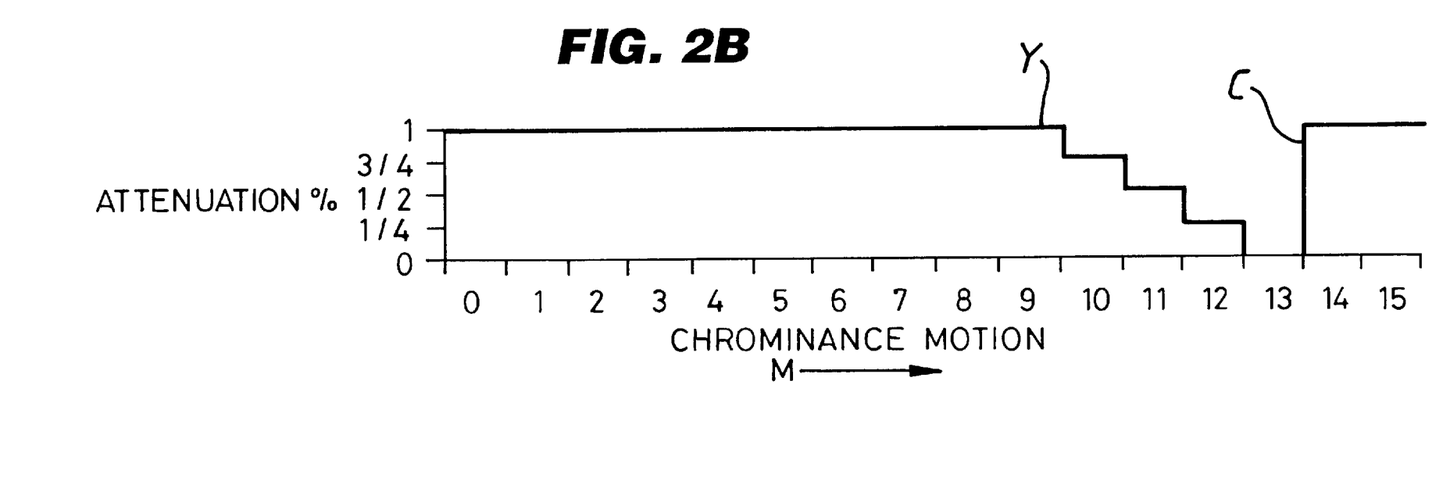

As shown in FIG. 2B, the behaviour of the motion detector circuit 1024' in the decoder is similar, except that the attenuation of the high-frequency luminance components is delayed until the motion signal adopts values of 10, 11, 12 and 13 (or higher).

Figure 3A:
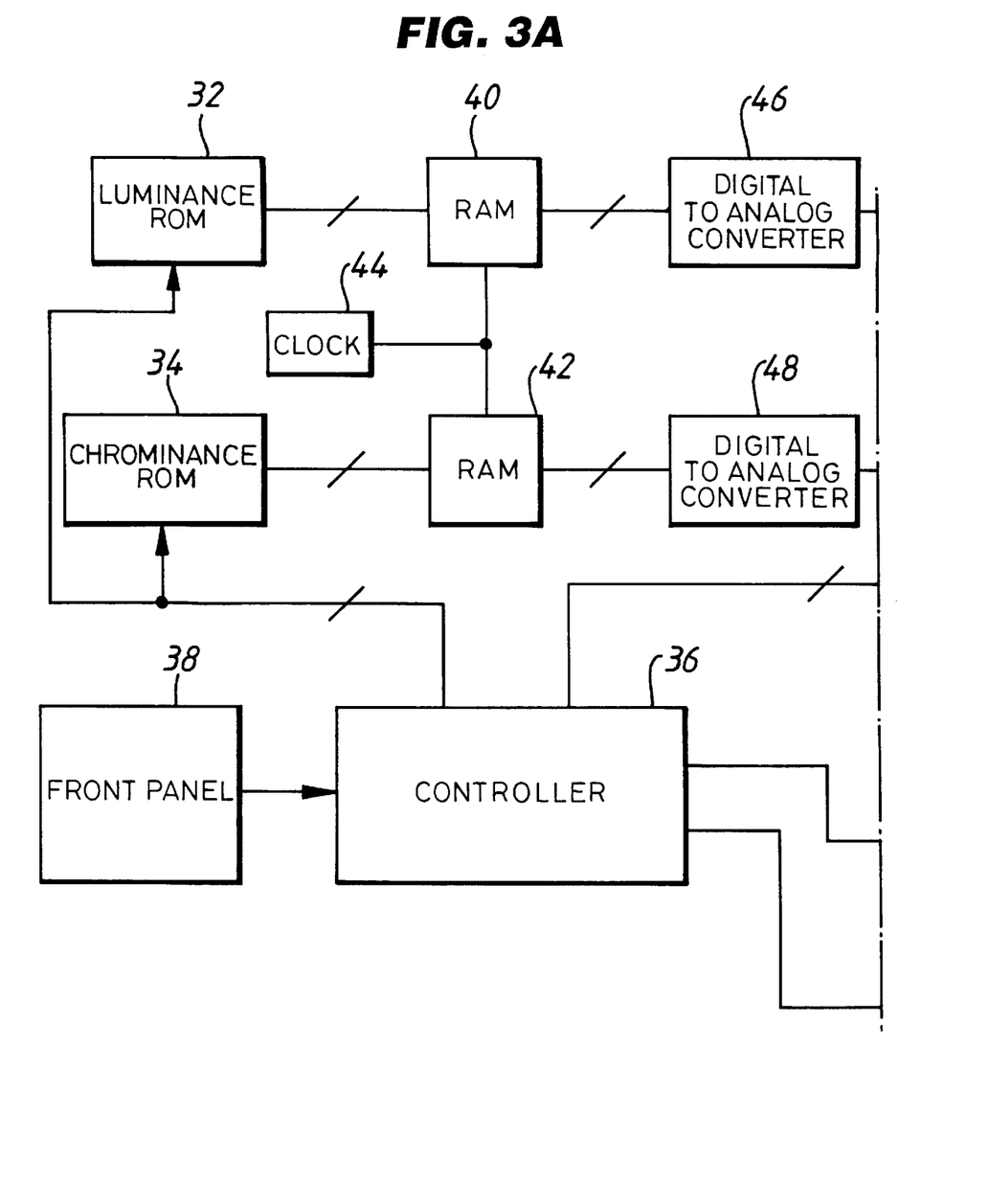
FIGS. 3A and 3B, when placed side by side, illustrate a block diagram of a test signal generator according to the present invention.
Figure 3B:
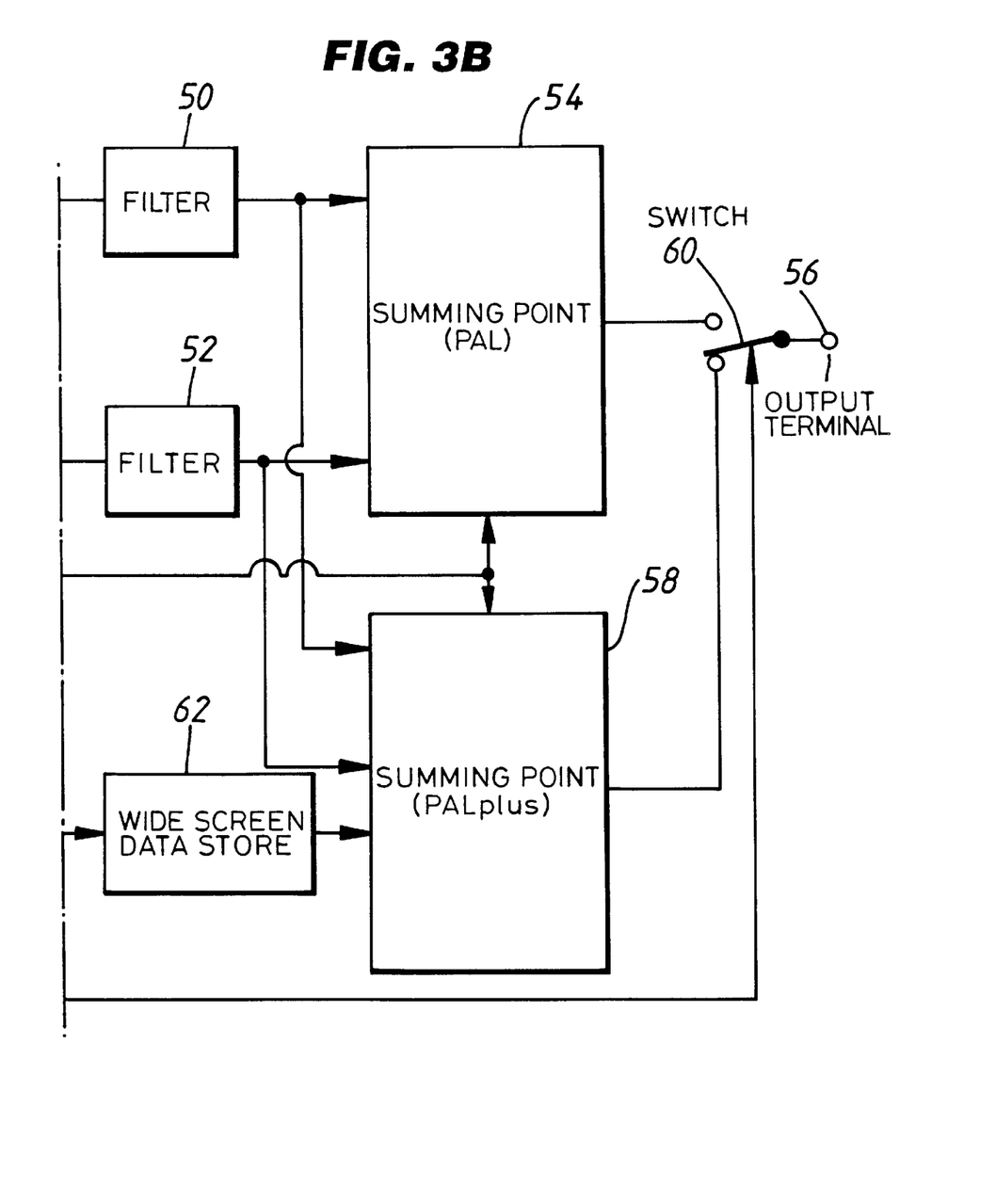

A test signal generator according to the present invention is shown in FIG. 3. The generator has a luminance ROM 32 and a chrominance ROM 34. The luminance ROM 32 stores the luminance (Y) values of the picture elements of a plurality of test patterns, and the chrominance ROM 34 stores the corresponding chrominance values ($C_B$, $C_R$) for those picture elements. A controller 36 is responsive to the operation of switches on a front panel 38 for controlling the operation of the system. In particular, the front panel 38 can be used to select a desired one of the test patterns, and in response thereto the controller 36 will cause the luminance and chrominance values associated with those test patterns to be read out of the ROMs 32 and 34 and delivered to respective random-access memories 40 and 42. The contents of the random access memories are then read out at a predetermined rate, using a clock 44, and delivered to digital-to-analog converters 46 and 48, and then to respective filters 50 and 52, the outputs of those filters thus forming the analog luminance and chrominance values for the test pattern. These are applied to a summing point 54, which can produce an output signal in standard (e.g. PAL) format delivered to an output terminal 56.

The above type of operation is conventional in television signal generators.

The generator also has a PALplus summing point 58 arranged to receive the luminance and chrominance signals. The controller 36 can, using a switch schematically illustrated at 60, determine whether the output should be in standard PAL format or PALplus format. Assuming that PALplus format is selected, the controller 36 will also cause a wide screen data store 62 to provide to the summing point 58 a number of data bits which will vary depending upon the particular pattern selected. The PALplus summing point 58 will convert the luminance signal and the chrominance signal into a PALplus format signal, which includes a line encoded with the wide screen data bits.

FIGS. 3A and 3B omits other parts of the signal generator which are known per se and not of particular relevance to the present invention.

Figure 4:
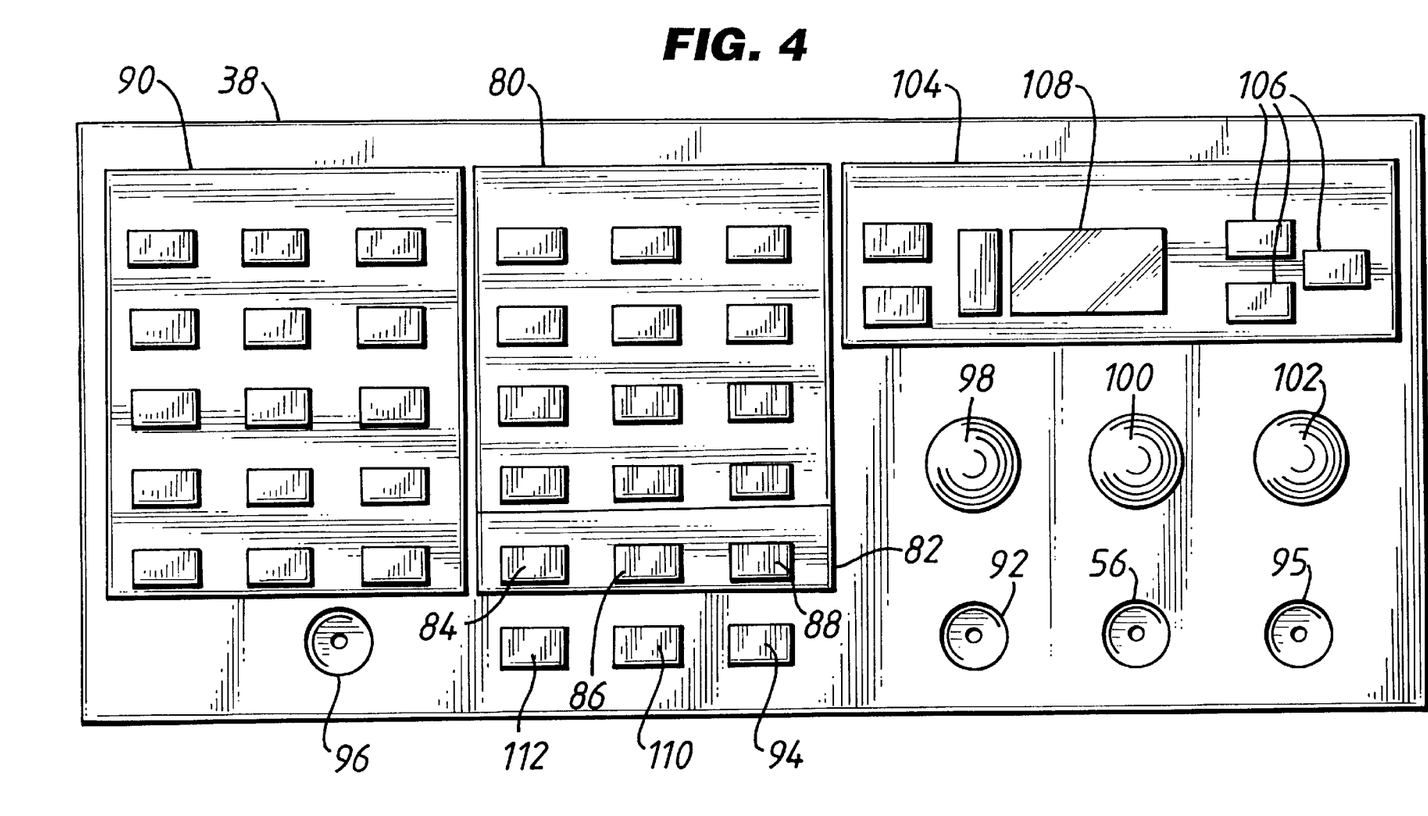
FIG. 4 illustrates the front panel of the generator.

The front panel 38 is shown in FIG. 4. The panel has regions 80 and 82 containing push buttons for selection of a test pattern. Each push button is associated with a respective test pattern. The section 80 contains push buttons associated with standard test patterns for use with both PAL and PALplus decoders. The section 82 contains three push buttons for generating test patterns particularly useful for the testing of PALplus decoders. Pressing any of the buttons within this section will cause the generation of an output signal in PALplus format.

Pressing the first button 84 causes the generation of a test signal according to the invention of European patent application No. 95303775.1, filed 2nd Jun. 1995 and corresponding to U.S. application Ser. No. 08/655,995, filed May 31, 1996, the disclosures of which are incorporated herein by reference. Pressing a second button 86 causes the generation of a zone plate test signal consisting of concentric circles and particularly suitable for testing for cross-colour interference patterns. Two versions of each of these two patterns are stored in the ROMs 32 and 34. If the appropriate button is pressed once, the first version of the pattern is retrieved and output in "film" mode, and if pressed twice the second version is generated and output in "camera" mode. These modes, which are recognised under the PALplus standard, differ primarily in that, in film mode, the picture content of each of the two fields within a single frame is stable, whereas in camera mode the picture content may represent movement between the fields. The main effect this has in the generator of the present invention is that the nature of the bits produced by the wide screen signal generator 62 differs depending upon the mode. (The contents of the two versions are also different, reflecting the different encoding processes applied to a source signal depending upon the chosen mode.)

Figure 5:
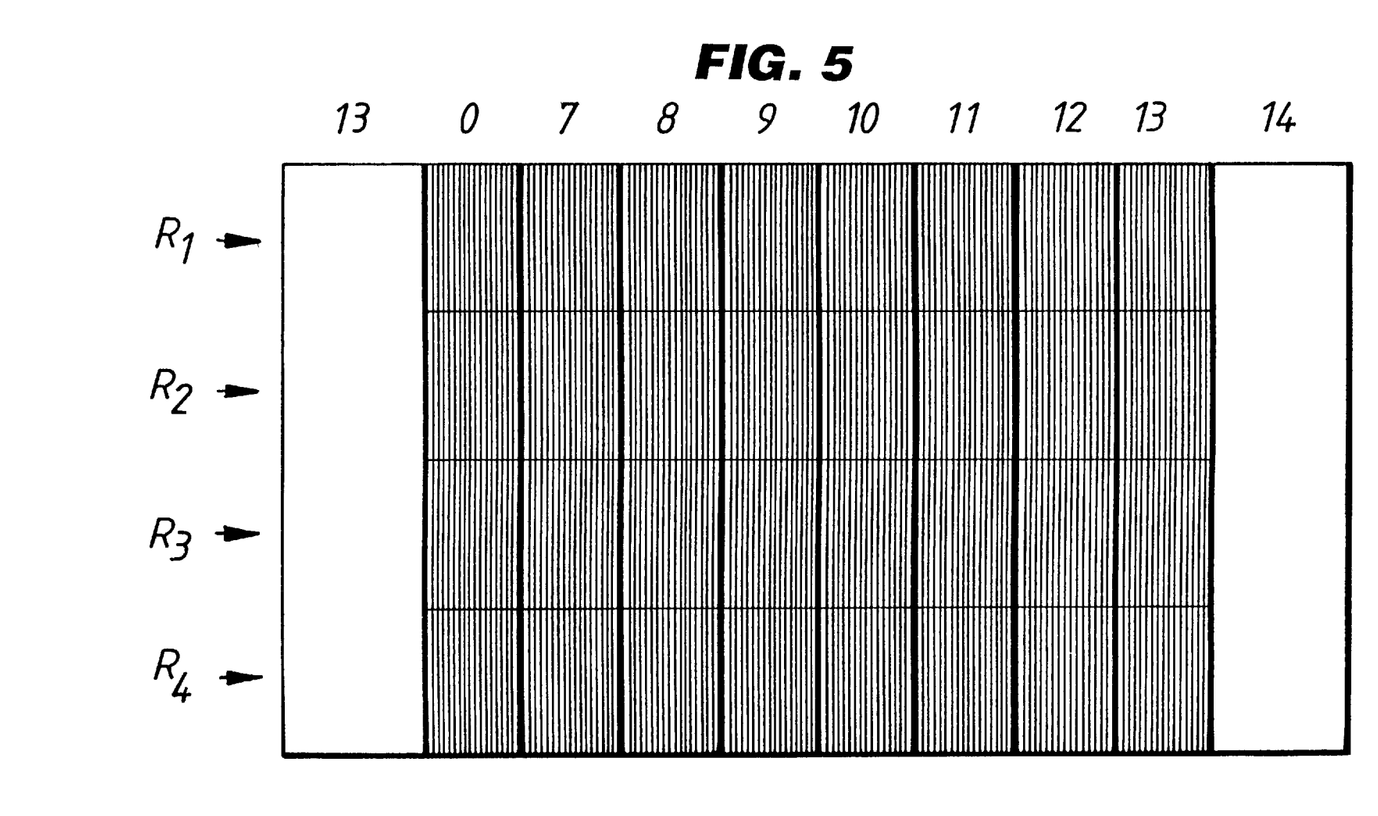
FIG. 5 shows a test pattern defined by the test signal of the invention.

The third PALplus pattern, generated by operating push button 88, is used for testing the motion adaptive colour plus feature of the decoder, and is shown in FIG. 5 and described in more detail below.

The front panel 38 also has an area 90 containing push buttons for use in selection of different sound signals which can be added to the test pattern signal, and which are not relevant to the present invention. There are also the video output terminal 56, an input terminal 92, a push button 94 which allows the output to be derived either from the internally-generated signal or from the input applied to input terminal 92, another output terminal 95 which contains an RF modulated version of the output signal, an output terminal 96 for supplying horizontal and vertical synchronising pulses, control knobs 98, 100 and 102 for controlling, respectively, the video level, the chrominance level and the RF amplitude, and a display area 104 which contain push buttons (e.g. 106) for controlling the nature of the information displayed on a screen 108.

The front panel 38 also has a switch 110 which switches the aspect ratio of the generated test pattern between 4:3 and 16:9, and a further switch 112 which controls the summing point 54 so that it behaves as a SECAM or a PAL/NTSC modulator. (Two thumbwheel switches (not shown) on the rear of the generator select between PAL and NTSC, and between different versions of SECAM.)

The signal generator of the preferred embodiment is arranged such that two frames of the test pattern produced by operating push button 88 are stored in the ROMs 32 and 34. The RAMs 40 and 42 have sufficient capacity to store both frames, and the circuits are arranged to read out the frames alternately.

The test pattern is illustrated in FIG. 5. The pattern consists of 4 rows $R_1$ to $R_4$ and 10 vertical columns. Disregarding the outermost columns, in the uppermost row $R_1$, the chrominance signal $C_B$, derived from the colour-difference signal (B-Y), is at a constant level, preferably equal to zero. The chrominance signal $C_R$, based on the (R-Y) colour-difference signal is negative, so that the overall colour of the row $R_1$ is cyan.

The level of saturation of the colour signal differs in the two stored frames, in most of the 8 columns. Accordingly, when the picture elements are analysed by a motion detector in a decoder, the average value for $C_R$ will change from frame to frame, giving rise to a motion signal M. The difference between the saturation levels of the two frames varies from column to column so that the value of M will adopt different predetermined values.

In the second column, the level of $C_R$ is equal in each frame, so that the value of the motion signal M will be equal to zero. In the 3rd to 9th column, $C_R$ varies from frame to frame in progressively greater amounts, so that the motion signals for each column are 7 to 13, respectively.

Row $R_2$ is identical to $R_1$, except that the chrominance signal $C_R$ is positive, rather than negative. Accordingly row $R_2$ is red. Row $R_3$ is identical to $R_1$, except that the level of $C_R$ is equal to zero, and $C_B$ has a negative value which varies in alternate frames, for most columns. Accordingly, row $R_3$ is yellow. Row $R_4$ is identical to row $R_3$, except that $C_B$ varies between positive levels, and therefore $R_4$ is blue.

In the left-most and right-most columns of all four rows, the chrominance signals for the first field of the first frame are identical to those of the first field of the second frame (except for the changing saturation levels which simulate movement), the chrominance signals for the second fields of the two frames are also identical (except for saturation levels), and in each frame the chrominance signals in the first field differ from those in the second field. Preferably, $C_R$ is positive and $C_B$ is negative for the first field (producing red lines) and $C_R$ and $C_B$ are both negative for the second field (producing green lines). The varying saturation levels give rise to a motion value M of 13 (associated with intra-frame averaged signals) for the left-most column and 14 (associated with direct chrominance signals) for the right-most column.

The luminance level in each of the left-most and right-most columns is uniform across the column. In the 2nd to 9th columns, the luminance level varies sinusoidally at a high frequency, above 3 MHz, and for example around 3.8 MHz. It will be noticed that this is visible in columns 2 to 9 as alternating lighter and darker vertical lines, there being preferably a plurality of cycles of the high frequency luminance component, i.e. a plurality of vertical lines, within each column.

FIG. 5 represents the test pattern as stored in the ROMs 32 and 34, and as viewed on a television receiver which is not equipped with a MACP decoder. It will be noted that the test pattern includes not only the rows $R_1$ to $R_4$, but also indicia "13,0,7 . . . 14" positioned above the respective columns to indicate the value of the motion signal M within those columns. It should be noted that the widths of the areas (in this case columns) within which the motion value M is constant, is preferably at least a plurality of pixels wide, and more preferably substantially wider, and includes a number of cycles of high frequency luminance as indicated above, so that the service engineer can more readily determine the behaviour of the decoder in response to known values for M.

If this test signal is now applied to a television signal decoder set up for MACP decoding, the picture as viewed on the screen will correspond to that of FIG. 5 in the first 5 columns and in the 10th column. However, in the 6th to 9th column, where the motion value M is from 10 to 13 respectively, the amplitude of the luminance signal is progressively diminished in accordance with FIG. 2B. Accordingly, the vertical lines will be less pronounced in the column associated with an M value of 10, further diminished in the column of M value 11, very faint in the column associated with M value 12, and imperceptible in the column associated with M value 13. The service engineer can thus readily observe the effect of the motion signal detector within the decoder.

In a receiver equipped for MACP decoding, the left-most column will appear dark-yellow, because the decoding will cause intra-frame averaging of the red and green lines. The right-most column, however, will appear to flicker between red and green, with a visible horizontal line structure, because intra-frame averaging will have been disabled due to the motion value M exceeding 13. Thus, the pattern demonstrates whether intra-frame averaging is occurring.

Various features of the test pattern can assist the user in determining the source of any problems which give rise to anomalies in the motion signal processing, including:

(a) The provision of areas (rows $R_1$ to $R_4$) in which only one of the chrominance signals varies, the other being constant or preferably zero, whereby the different effects of the chrominance signals on the motion value M can be observed;

(b) the legends indicating the motion values M within the respective areas, whereby erroneous derivation of the value M can be easily seen;

(c) the provision of two areas with different motion values (corresponding to enabling and disabling intra-frame averaging), the hue in each area varying between fields, so that the operation of intra-frame averaging can easily be observed.

The pattern shown in FIG. 5 is generated by operating the push button 88 in FIG. 4. In the preferred embodiment, the pattern is produced by two presses of the push button 88, a single press generating a further pattern, which corresponds to that shown in FIG. 5 except that it is modified to correspond to the effect that MACP processing of an encoder would have upon the pattern. That is to say, the high-frequency luminance signal is attenuated in accordance with FIG. 2A, so that it diminishes progressively in the columns associated with motion signal values M of 8, 9 and 10, and disappears in columns 11, 12 and 13. In the pattern as stored, therefore, the vertical lines in columns 8, 9 and 10 will fade in a stepwise progression and disappear in columns 11, 12 and 13. This is also how the pattern will be observed on a standard television decoder which does not have MACP processing. However, when observed on a television which does have MACP processing, there will be even greater attenuation in the columns associated with an M value of 10 or greater, so that the vertical lines in this column will be even fainter.

The left-most column of the second test pattern would have corresponding hues in both fields of a frame, because in an encoder the motion value M would cause intra-frame averaging. Thus the left-most column will appear dark-yellow and the right-most column would flicker, irrespective of whether the receiver has MACP processing.

The two patterns generated by pushing button 88 are preferably created by developing an initial test pattern, generating data representing a first pattern from the initial pattern, this data comprising two frames, the chrominance content differing from frame to frame, and generating second data representing two frames of a second test pattern, with the chrominance content again varying between the frames. Only one of the generation steps will involve MACP processing, in which a motion signal is derived and used to control attenuation of high frequency luminance components and determine whether intra-frame averaging is performed. The invention also extends to a method of generating patterns in this manner.

In the above embodiment, the PAL and PALplus test patterns are generated using the same ROMS, RAMS, filters, clocks, etc. If desired, separate circuitry can be provided for PAL and PALplus patterns; this would reduce the amount of memory storage required, because PAL test patterns can be stored using less data, and only a single frame needs to be stored.

In the above embodiment, motion is simulated by repeatedly and alternately generating two television signal frames, with the chrominance content different in the two frames. By way of an alternative, it is possible to generate only a single frame, and have hardware circuitry which modifies the $C_B$ and/or $C_R$ values output from the ROM 42 alternately in successive frames.

Similarly, instead of storing two MACP test patterns as described above, it would be possible to store a single test pattern and then have circuitry which can be brought into operation to simulate an encoding process to modify the pattern as output by the generator.

We claim:

1. A test signal provided at the output terminal of a signal generator for testing a television signal decoder which decodes a television signal by attenuating high frequency luminance components in dependence on detected changes, with respect to time, in the chrominance content of elements of a picture defined by the signal, the test signal containing a high frequency luminance component, and defining picture areas each containing a plurality of cycles of said high frequency luminance component and each having a chrominance content which varies with respect to time at a rate which is constant within the area but different from rates in other areas.

2. A test signal as claimed in claim 1, the chrominance content of the signal being defined by two chrominance signals, wherein, within each area, only one of the chrominance signals varies with respect to time, the other being constant.

3. A test signal as claimed in claim 2, wherein said other chrominance signal is a colour difference signal of zero.

4. A test signal as claimed in claim 1, wherein the test signal defines a picture including numerical characters adjacent each said area and providing an indication of the rate of variation of the chrominance content within the area.

5. A test signal as claimed in claim 1, including a plurality of sets of areas, the areas within each set being of substantially equal hue, the hue being different for the different sets.

6. A test signal as claimed in claim 1, wherein the test signal defines a further picture area which does not have said high frequency luminance component.

7. A test signal as claimed in claim 1, for use in testing a decoder which outputs selectively either an intra-frame averaged chrominance signal or chrominance signals separately derived from respective fields in a frame, in dependence on said detected changes, wherein the test signal defines an intra-frame averaging test region, in which the chrominance content defines a hue which differs from field to field, and a saturation level which differs from frame to frame.

8. A test signal as claimed in claim 7, including two such intra-frame averaging test regions, wherein the degree of change in saturation from frame to frame differs in the two areas.

9. A test signal as claimed in claim 7, wherein the test signal defines a further region in which the chrominance content defines a saturation level which differs from field to field by an amount which is less than that of said intra-frame averaging test area, the chrominance content of the further region defining a hue which is constant from field to field.

10. A test signal as claimed in claim 1, wherein the high frequency luminance component has substantially equal amplitude in the respective picture areas.

11. A test signal as claimed in claim 1, wherein the high frequency luminance component has different amplitudes in different areas, areas with chrominance contents which vary at a higher rate having a high frequency luminance component of lower amplitude.

12. A test signal provided at the output terminal of a signal generator for testing a television signal decoder which decodes a television signal by attenuating high frequency luminance components in dependence on detected changes, with respect to time, in the chrominance content of the signal, the test signal containing a high frequency luminance component and defining a picture region throughout which one of two chrominance signals defining said chrominance content varies with respect to time at different rates, the other chrominance signal being constant throughout that region.

13. A signal generator for testing a television signal decoder which decodes a television signal by attenuating high frequency luminance components in dependence on detected changes, with respect to time, in the chrominance content of elements of a picture defined by the signal, the signal generator being operable to generate a test signal containing a high frequency luminance component, and defining picture areas each containing a plurality of cycles of said high frequency luminance component and each having a chrominance content which varies with respect to time at a rate which is constant within the area but different from the rates in other areas.

14. A signal generator as claimed in claim 13, the generator selectively being operable to generate a first test signal, wherein the high frequency luminance component has substantially equal amplitude in the respective picture areas, and a second test signal, wherein the high frequency luminance component has different amplitudes in different areas, areas with chrominance contents which vary at a higher rate having a high frequency luminance component of lower amplitude.

15. A memory storing data defining two frames of a test pattern for testing a television signal decoder which decodes a television signal by attenuating high frequency luminance components in dependence on detected changes, with respect to time, in the chrominance content of elements of a picture defined by the signal;

the test pattern having picture areas each containing a plurality of cycles of a high frequency luminance component and each having a chrominance content which varies from frame to frame by an amount which is different from the amounts in the other areas.

16. A method of testing a television signal decoder which decodes a television signal by attenuating high frequency luminance components in dependence on detected changes, with respect to time, in the chrominance content of elements of a picture defined by the signal, the method comprising:

(a) applying to the decoder a test signal containing a high frequency luminance component, and defining picture areas each containing a plurality of cycles of said high frequency luminance component and each having a chrominance content which varies with respect to time at a rate which is constant within the area but different from the rates in other areas;

(b) observing a picture generated by an output of the decoder; and (c) determining whether the decoder is attenuating the high frequency luminance component by inspection of the picture to determine differences between the visibility of the high frequency component in respective areas.

* * * * *